United States Patent [19]

Escaravage

[11] Patent Number: 4,858,954
[45] Date of Patent: Aug. 22, 1989

[54] DEVICE FOR ADJUSTING THE POSITION OF A STRAP RETURN ELEMENT OF IN PARTICULAR AN AUTOMOBILE VEHICLE SAFETY BELT

[75] Inventor: Gérard Escaravage, Valentigney, France

[73] Assignee: ECIA - Equipements et Composants Pour L'Industrie Automobile, Audincourt, France

[21] Appl. No.: 208,536

[22] Filed: Jun. 20, 1988

[30] Foreign Application Priority Data

Jun. 19, 1987 [FR] France ................................. 8708634

[51] Int. Cl.$^4$ .............................................. B60R 22/20
[52] U.S. Cl. ................................................... 280/808
[58] Field of Search ................................ 280/808, 801

[56] References Cited

U.S. PATENT DOCUMENTS 3,964,798  6/1976  Burleigh ............................. 280/808
4,611,825  9/1986  Patterson ........................... 280/808

FOREIGN PATENT DOCUMENTS 2460092  6/1976  Fed. Rep. of Germany ...... 280/808
3112458  10/1982  Fed. Rep. of Germany .

*Primary Examiner*—Kenneth R. Rice
*Attorney, Agent, or Firm*—Sughrue, Mion, Zinn, Macpeak & Seas

[57] ABSTRACT

The device comprises a guide rail (1) fixed to a post of the vehicle and including an opening (3) in which is movable a fixing pin (4) of the strap return element (5), the pin having a base. An element (11) constituting a lock defining a generally C-shaped opening (12) which has a width less than the dimension of the base of the pin, is provided between the base (10) and the rail (1) and mounted to be movable by control means (13, 14) between a first locking position in which the two branches of the C-shaped opening (12) of the element constituting a lock are in facing relation to the opening (3) of the rail (1) so as to define two apertures for locking the pin of the return element in positions corresponding to two end positions of the strap return element (5), and a second position for shifting the return element in which the intermediate part of the C-shaped opening (12) of the element constituting a lock is in facing relation to the opening (3) of the rail (1) to permit the shifting of the return element (5). Resilient means (15) are provided for biasing the element constituting a lock to the locking position thereof.

7 Claims, 1 Drawing Sheet

DEVICE FOR ADJUSTING THE POSITION OF A STRAP RETURN ELEMENT OF IN PARTICULAR AN AUTOMOBILE VEHICLE SAFETY BELT

BACKGROUND OF THE INVENTION

The present invention relates to a device for adjusting the position of a strap return element of in particular an automobile vehicle safety belt.

In most vehicles, this strip return element is disposed on an anchoring tab fixed to the body of the vehicle at a height suitable for the majority of users of so-called normal size.

However, this height is unsuitable for certain users and in particular persons of small size.

In order to solve this problem, a number of devices are known in the art for adjusting the height of this strap return element.

Thus, for example, a device is known from the document FR.2 484 343 for adjusting the height of an anchoring point of a safety belt in which a slide moves along a screw-threaded support rod in the anchoring adjusting range, said rod being rotatively mounted between the walls of a case fixed to an element of the body of the vehicle. The front side of this slide carries an anchoring member for the belt and its rear side carries an element for preventing rotation of the slide which guides it along the inner wall of the case.

A device is also known from the document FR 2 488 201 for adjusting the height of a return element of a vehicle safety belt comprising an adjusting element carrying the return element with a lock which engages in stop notches of a rectilinear guide, it being possible to disengage the lock by an actuating mechanism.

A device is also known from the document FR. 2 482 539 for adjusting the anchoring point of a safety belt disposed above the shoulder of an occupant of a vehicle, in which the anchoring point is carried by a slideway cursor which is movably mounted in a slideway and is capable of being heldx in position by a catch which cooperates with a series of orifices provided in the slideway.

The document FR. 2 513 887 discloses a device for adjusting the position in height of the upper mount of the shoulder strap of a safety belt. This device comprises a slideway mounted on the body of the vehicle, provided with a guide slot and recesses in which penetrates at least one locking element mounted on a slide which carries the upper mount and is capable of being locked and unlocked by a manual actuating element.

The document FR. 2 543 838 discloses an anchoring device for the upper point of a safety belt, comprising a rail having a plurality of apertures which are in two parts, and a locking lug which can be controlled by an actuating knob. The position of the anchoring point is adjusted by the extraction of the lug from an aperture, the displacement of the slide and the reintroduction of the lug in another aperture.

Lastly, the document FR 2 536 288 discloses a device for adjusting the height of a safety belt for an automobile vehicle consisting of a guiding slideway having two sides, locking openings disposed one above the other, and a carriage movable in the slideway, this carriage carrying a fixing or return member of the belt and including stop elements which are transversely movable relative to the direction of movement of the carriage by means of a knob in opposition to the action of a spring for changing from a locking position to an unlocking position.

However, all these devices have a certain number of drawbacks, in particular as concerns possibilities of adjustment, their relatively complex structure and consequently their relatively high manufacturing and mounting costs.

Furthermore, in most of the known devices, the locking elements are biased to their locking position by resilient means which exert thereon a relatively large maintaining force. This obliges the user who desires to shift the strap return element to exert on the elements for shifting these locking means a relatively large force for shifting the locking means to their retracted position and allow the displacement of the strap return element.

SUMMARY OF THE INVENTION

An object of the invention is therefore to solve the aforementioned problems by providing a simple, rapid and precise device for adjusting the position of the strap return element and thus adapting the strap to the morphology of the user.

The invention therefore provides a device for adjusting the position of a strap return element, of in particular an automobile vehicle safety belt, between two end positions, of the type comprising a guide rail fixed to a post of the vehicle and including an opening in which is moveable a fixing pin for the return element, said pin including a base, wherein an element constituting a lock which has a generally C-shaped opening and a width less than the dimension of the pin, is provided between the base and the rail and is mounted to be movable by control means between a first locking position in which the two branches of the C-shaped opening of the element constituting a lock are in facing relation to the opening of the rail so as to define two apertures for locking the pin of the return element in positions corresponding to said end positions, and a second position for shifting the return element in which the intermediate portion of the C-shaped opening of the element constituting a lock is in facing relation to the opening of the rail to permit the shifting of the return element, resilient means being provided for biasing the element constituting the lock to the locking position.

A better understanding of the invention will be had from the following description which is given solely by way of example with reference to the accompanying drawings, in which:

DETAILED DESCRIPTION OF PREFERRED EMBODIMENTS

Figure 1:
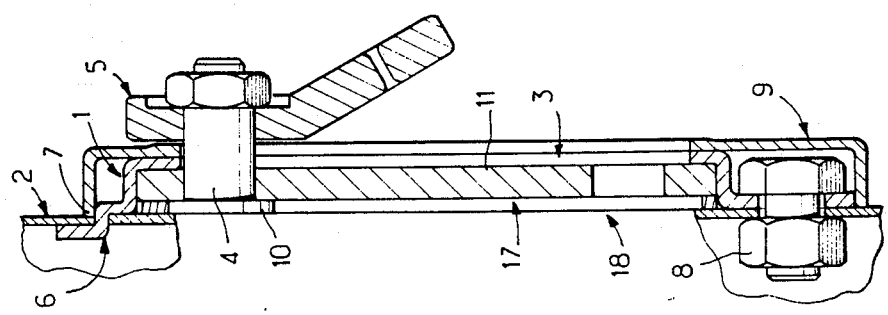
FIG. 1 is a sectional view of a device according to the invention.
Figure 2:
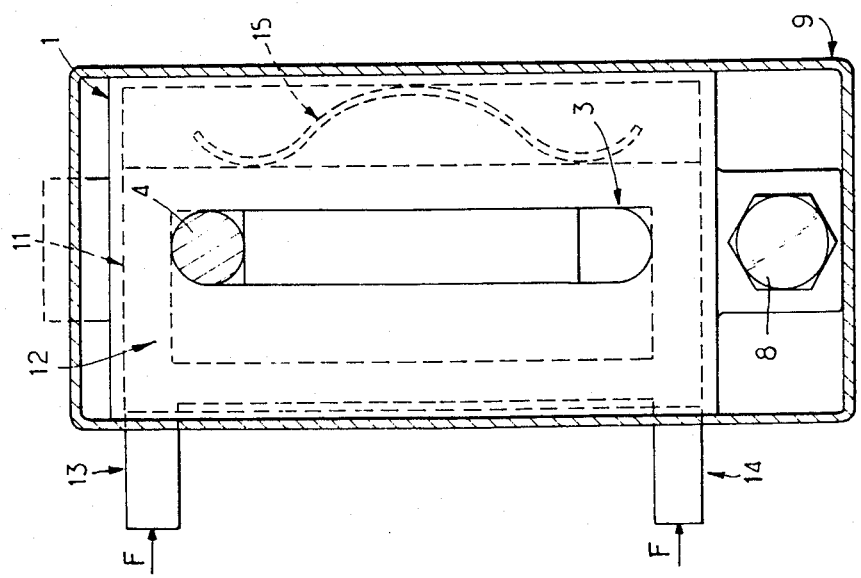
FIG. 2 is a front elevational view of a device according to the invention.

As can be seen in FIGS. 1 and 2, a device for adjusting the position of a strap return element, of in particular an automobile vehicle safety belt, comprises, according to the invention, a guide rail 1 in the form of a bottom-less care fixed to a post 2 of the automobile vehicle and defining an opening 3 which is for example rectilinear, in which is movable a fixing pin 4 for the strap return element 5.

The rail 1 is fixed to the post 2 of the vehicle for example in the upper part of the latter by a bent portion 6 of the rail which is engaged in an opening 7 in the post, and in the lower part of the return element by a screw-and-nut system 8. A covering 9 of known type may also be provided around the assembly to improve the appearance of the latter.

The fixing pin 4 for the return element 5 has a base 10, for example a square base, and an element constituting a lock 11 is disposed between this base and the rail 1, as shown more particularly in FIG. 1. This element 11 constituting a lock has a generally C-shaped opening 12 (FIG. 2) whose width is less than the dimension of the base 11 of the fixing pin 4 of the return element for the purpose of locking the pin 4 in the rail. This element constituting a lock is mounted to be movable by control means, for example 13 and 14, between a first locking position shown in FIG. 2 in which the two branches of the C-shaped opening 12 of the element constituting a lock are in facing relation to the opening 3 of the rail for defining two aperatures for locking the pin of the return element in positions which correspond to two end locking positions and a second position for shifting the return element, in which the intermediate portion of the C-shaped opening 12 of the element 11 constituting a lock is in facing relation to the opening 3 of the rail 1 to permit the shifting of the return element.

Resilient means 15 are provided for biasing the element constituting a lock 11 to the locking position. The control means 13 and 14 are formed by two control members disposed in the upper part and in the lower part of the element constituting a lock 11 and adapted to cooperate with corresponding portions of the element constituting a lock 11. The resilient means 15 are disposed between the element constituting a lock 11 and the edge of the rail on the side remote from the control means 13 and 14.

Advantageously, these resilient means may be formed by a bent resilient strip which bears on one hand against the rail and on the other hand against the element constituting a lock.

At rest, the resilient means bias the element constituting a lock 11 to the locking position as shown in FIG. 2. When the user desires to shift the strap return element to either the lower position or the upper position, he exerts on the control means 13 and 14 a force illustrated by the arrows F in FIG. 2 in order to shift the element constituting a lock, by a sliding thereof in the rail, to its position for shifting the strap return element in which the pin 4 of the strap return element is movable along the opening 3 of the rail. Further, the base 10 of the pin 4 moves in an opening 17 of a guide plate 18 provided between the element constituting a lock 11 and the post 2 of the vehicle, for guiding the pin 4 during its movement and thereby facilitating the movement of the pin 4 and reducing the operating noise.

Figure 3:
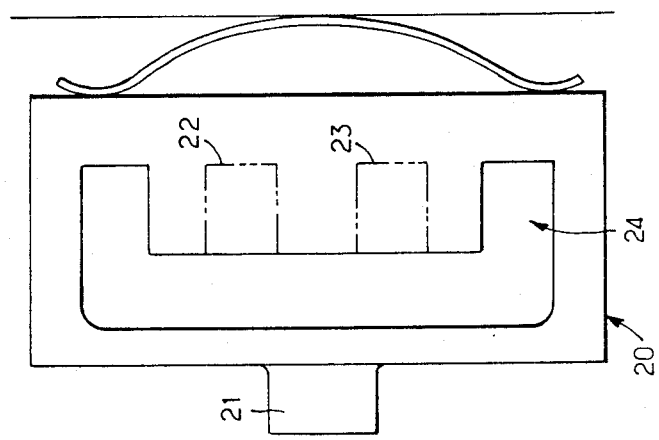
FIG. 3 is a view of a modification of an element constituting a lock which is part of the construction of a device according to the invention.

As shown in FIG. 3, an element constituting a lock 20 may also comprise merely a single control element 21 which is for example in one piece with the rest of the element 20.

It will be understood that additional recesses 22, 23 may be provided adjacent to the intermediate portion of the opening 24 of the element constituting a lock 20 for the purpose of providing additional positions of adjustment of the strap return element.

What is claimed is:

1. Device for adjusting the position of a strap return element, of in particular an automobile vehicle safety belt, between two end positions, said device comprising:

a relatively flat hollow guide rail for fixing to a post of the vehicle and having a front wall including an opening in the form of a rectilinear slot;

a fixing pin longitudinally movable in said slot, and having an outer end for said strap return element and an inner end with a base located in said rail and having a dimension larger than the width of said slot;

an element constituting a lock having the form of a platen located between said base and said wall parallel to the latter and defining a generally C-shaped opening having two branches and an intermediate part, said C-shaped opening having a width less than the dimension of said base;

said platen being movably mounted in its plane between a first locking position, in which said two branches are in facing relation to said slot so as to define two apertures for selectively positively capturing and locking said pin in two positions corresponding to said end positions, and a second releasing position in which said intermediate part is facing said slot to permit the shifting of said pin and strap return element;

resilient means for biasing said platen to its first position; and control means acting on said platen and manually operable from the outside of said rail for shifting said platen from its first position to its second position against the bias of said resilient means.

2. Device according to claim 1, comprising a guide plate defining a guiding opening for guiding the base of the pin of the return element and disposed between the element constituting a lock and said post of the vehicle.

3. Device according to claim 1, wherein the resilient means are disposed between the element constituting a lock and the rail on a side thereof remote from said control means.

4. Device according to claim 1, wherein the resilient means comprise at least one bent resilient strip which bears against the element constituting a lock and against the rail.

5. Device according to claim 1, wherein the control means comprise two control elements disposed in an upper part and a lower part of the rail and each adapted to cooperate with a corresponding portion of the element constituting a lock for shifting the element constituting a lock to the position for shifting the pin and the return element.

6. Device according to claim 1, wherein the control means comprise a control element which is in one piece with the element constituting a lock.

7. Device according to claim 1, comprising additional recesses in a region of the element constituting a lock adjacent to the intermediate part of the C-shaped opening and defining as many positions of adjustment for the pin and the return element.

* * * * *